United States Patent [19]

Reginato et al.

[11] 4,247,669

[45] Jan. 27, 1981

[54] PROCESS FOR THE POLYMERIZATION OF OLEFINS

[75] Inventors: Luigi Reginato, Brussels; Charles Bienfait, Vilvorde; Jacques Stevens, Braine-l'Alleud, all of Belgium

[73] Assignee: Solvay & Cie, Brussels, Belgium

[21] Appl. No.: 106,711

[22] Filed: Dec. 26, 1979

Related U.S. Application Data

[63] Continuation of Ser. No. 681,576, Apr. 29, 1976, abandoned, which is a continuation of Ser. No. 153,788, Jun. 16, 1971, abandoned.

[30] Foreign Application Priority Data

Jun. 18, 1970 [LU] Luxembourg .......................... 61150
Aug. 10, 1970 [LU] Luxembourg .......................... 61839

[51] Int. Cl.$^3$ .......................... C08F 4/02; C08F 10/02
[52] U.S. Cl. .......................... 526/156; 252/429 C; 252/430; 526/119; 526/352
[58] Field of Search .......................... 252/429 C; 526/156

[56] References Cited

U.S. PATENT DOCUMENTS

| 3,166,542 | 1/1965 | Orzechowski et al. | 526/156 |
| 3,325,247 | 6/1967 | Magee et al. | 252/463 |
| 3,506,633 | 4/1970 | Matsuura et al. | 526/156 |
| 3,513,150 | 5/1970 | Matsuura et al. | 526/156 |
| 3,526,616 | 9/1970 | Dilbouille et al. | 526/119 |

FOREIGN PATENT DOCUMENTS 1140649  1/1969  United Kingdom .................... 526/124

OTHER PUBLICATIONS

Benesi et al., Analytical Chemistry, vol. 27, (1955), pp. 1963–1965.

*Primary Examiner*—Edward J. Smith
*Attorney, Agent, or Firm*—Pennie & Edmonds

[57] ABSTRACT

Alumina-supported halogen-containing transition metal compounds prepared in such manner that (a) the transition metal compound is chemically bound to and supported by an activated alumina having a high surface area and an internal pore volume greater than 0.8 cc/g., (b) the concentration of the transition metal compound chemically bound to the support is greater than 10 grams of transition metal per kilogram of activated alumina, and (c) the atom ratio of halogen to transition metal on the support is higher than that of the halogen-containing transition metal compound which is used and preferably greater than 3:1, have been found to be unusually effective cocatalysts for the polymerization of ethylene and other α-olefins. These supported cocatalysts, which may be used to produce polyethylene as well as interpolymers of ethylene with other α-olefins and with diolefins, are prepared by heating an alumina hydrate (such as boehmite) to a temperature in the range from about 500° C. to 900° C. for a period of time sufficient to form an activated alumina having an internal pore volume greater than 0.8 cc/g., and then reacting the resultant activated alumina under substantially anhydrous conditions with a halogen-containing compound of a transition metal of Groups IV-A, V-A or VI-A of the Periodic Table. When ethylene is polymerized or copolymerized in the presence of a catalytic amount of the reaction product of an organometallic compound of a metal of Groups I-B, II-A, II-B, III-B or IV-B of the Periodic Table, and one of these supported cocatalysts, it is possible to produce normally solid, high molecular weight polyethylene or interpolymers of ethylene and other α-olefins at exceptionally high yields of polymer per gram of catalyst.

7 Claims, No Drawings

PROCESS FOR THE POLYMERIZATION OF OLEFINS

This is a continuation of application Ser. No. 681,576 filed Apr. 29, 1976, now abandoned, which in turn is a continuation of Ser. No 153,788, filed June 16, 1971, now abandoned.

INTRODUCTION

This invention relates to the polymerization of ethylene to form either polyethylene, interpolymers of ethylene and other α-olefins, or interpolymers of ethylene and diolefins. The invention is based on the discoveries, firstly, that an activated alumina having an internal pore volume greater than 0.8 cc/g. can be reacted with a halogen-containing transition metal compound to form a class of supported cocatalysts in which (a) the transition metal compound is chemically bound to and supported by the activated alumina, (b) the concentration of the transition metal compound chemically bound to the support is greater than 10 grams of transition metal per kilogram of activated alumina, and (c) the ratio of halogen to transition metal on the support is higher than that of the halogen-containing transition metal compound which is used and preferably greater than 3:1; and secondly, that these supported cocatalysts, when further reacted with an organometallic compound, are unusually effective in the polymerization of ethylene. The invention provides an improved process for the polymerization of ethylene by which it is possible to produce high molecular weight polyethylenes at exceptionally high polymer yields per gram of catalyst leaving only trace amounts of catalyst residues in the polymer which need not be removed. This invention also provides a process for preparing these highly active polymerization catalysts.

CONCISE REVIEW OF PRIOR DEVELOPMENTS AND THE PROBLEM OF LOW CATALYST ACTIVITY

Almost two decades have passed since the discovery (or rediscovery) that certain organometallic compounds react with transition metal compounds to form what is generically known as Ziegler-type catalysts for the low pressure polymerization of ethylene and other α-olefins and diolefins, during which period research investigators have made extensive use of this technology in preparing supported catalysts for use in olefin polymerizations using halogen-containing transition metal compounds alone or in conjunction with the organometallic compound.

Initially, these supported catalysts were prepared by fixing the particular halogen-containing transition metal compound on an oxide support (such as silica, alumina, silica-alumina mixtures, thoria, zirconia and comparable oxides) by vapor or solution deposition onto the support while removing any by-product gaseous hydrogen halides from the fixation reaction. This technique, which is described in the Orzechowski et al. U.S. Pat. Nos. 3,166,542 and 3,216,982 (and in the counterpart French Pat. No. 1,349,864) and which is also described in British Pat. No. 823,024, invariably results in catalysts characterized by a very low productivity, the usual order of magnitude being only about 20 or 30 grams of polymer per gram of catalyst and frequently even less.

Somewhat more efficient alumina-supported catalysts for olefin polymerization are described in the Matsuura et al. patent U.S. Pat. No. 3,506,633, in which the catalyst is formed by reacting the organometallic compound with an alumina-supported titanium tetrachloride cocatalyst in which the Cl/Ti ratio is in the range from 2.5 to 3.5. To prepare the alumina-supported cocatalyst, gaseous titanium tetrachloride is reacted with (or perhaps adsorbed onto) an amorphous alumina having a high surface area and a total pore volume less than 0.7 cc/g. and preferably less than 0.5 cc/g. The particular amorphous alumina used for the supported cocatalyst may be prepared either (a) by hydrolyzing an aluminum alkoxide to an amorphous alumina, or (b) by forming an alumina hydrogel according to the method described in British Pat. No. 980,893 followed by calcination to form a substantially amorphous alumina (the so-called ρ-alumina). Experience has shown, however, that the olefin polymerization catalysts produced by the technique described in the Matsuura et al. U.S. Pat. No. 3,506,633 are still characterized by a low productivity.

In the commercial production of low pressure polyethylene, however, the use of catalysts having a high productivity is frequently the difference between making an acceptable or a non-acceptable product. The higher the catalyst productivity (which is a measure of the grams of polymer produced per gram of catalyst per hour), the lower the concentration of catalyst residues remaining in the polymer. Very low concentration of catalyst residues in the polymer are innocuous and consequently, need not be removed by expensive deashing procedures. For this reason, the polyolefin industry has focused considerable research efforts on developing polymerization catalysts having high productivity for the low pressure polymerization of ethylene.

SUMMARY OF THE INVENTION

Using specially prepared activated alumina in which the internal pore volume is greater than 0.8 cc/g., we have prepared a class of supported cocatalysts by reacting under substantially anhydrous conditions the activated alumina with a halogen-containing compound of a transition metal of Groups IV-A, V-A and VI-A such that (a) the transition metal compound is chemically bound to and supported by the activated alumina, (b) the concentration of the transition metal compound is chemically bound to the support is greater than 10 grams of transition metal per kilogram of activated alumina, and (c) the ratio of halogen to transition metal on the support is higher than that of the halogen-containing transition metal compound which is used and preferably greater than 3:1. We have found that these supported cocatalysts, when further reacted with an organometallic compound, are unusually effective in the polymerization of ethylene to high molecular weight polyethylenes at exceptionally high polymer yields per gram of catalyst, leaving only trace amounts of catalyst residues in the polymer which need not be removed.

Based on these discoveries, the invention provides an improved process for the polymerization of ethylene (including the copolymerization of ethylene with other α-olefins and with diolefins) which comprises contacting ethylene, at a temperature and at a pressure sufficient to initiate the polymerization reaction, with a catalytic amount of the reaction product of (A) an organometallic compound of a metal selected from the group consisting of Groups I-B, II-A, II-B, III-B and IV-B of the Periodic Table; and (B) a supported cocatalyst prepared by reacting under substantially anhydrous conditions
   (1) a halogen-containing compound of a transition metal selected from the group consisting of Groups IV-A, V-A and VI-A of the Periodic Table, together with
   (2) an activated alumina having a high surface area and an internal porosity greater than 0.8 cc/g., to form a supported cocatalyst in which (a) the halogen-containing transition metal compound is chemically bound to and supported by the activated alumina, (b) the concentration of the transition metal compound is greater than 10 grams of the transition metal per kilogram of activated alumina, and (c) the ratio of halogen to transition metal in the supported cocatalyst is higher than that of the halogen-containing transition metal compound used for the reaction. The invention also contemplates the process by which these highly active polymerization catalysts are prepared.

BASIC PARAMETERS OF THE PROCESS

The process of the invention may be more fully understood by a discussion of (I) the preparation of the supported cocatalyst, which require the use of an activated alumina having an internal pore volume greater than 0.8 cc/g., (II) the formation of the polymerization catalyst, which is the reaction product of the supported cocatalyst and the organometallic compound, and (III) the polymerization of ethylene by contacting this monomer with a catalytic amount of the resultant reaction product at a temperature and at a pressure sufficient to initiate the polymerization reaction.

I. Preparation of the Supported Cocatalyst

Based on experimental evidence, we have found that it is possible to obtain catalyst productivities greater than 500 and frequently as high as 700 grams of polymer per gram of catalyst when the polymerization catalyst is prepared from supported cocatalysts made, in turn, from activated aluminas having an internal pore volume greater than 0.8 cc/g. These activated aluminas are themselves prepared by heating alumina hydrates at high temperatures (generally in excess of 500° C.), the most commonly used alumina hydrates being the α-trihydrate (hydrargillite or gibbsite), the β-trihydrate (bayerite or nordstrandite), the α-monohydrate (boehmite) and the β-monohydrate (diaspore). When the trihydrates are heated to temperatures higher than about 200° C., part of the water of hydration is released and a portion of the trihydrate is converted to monohydrate. At temperatures in excess of 400° C., the monohydrates become unstable and decompose to yield various crystalline forms of alumina. The particular crystalline form of alumina obtained is dependent on the particular alumina hydrate and activation temperatures used. Whatever the alumina hydrate used, however, the end-product is α-alumina when temperatures in excess of about 1100° C. are used.

Any of the commonly used alumina hydrates described above may be converted into an activated alumina having an internal pore volume greater than 0.8 cc/g. when heated to a temperature in the range from about 500° C. to 900° C. For best results, the alumina hydrate should be heated at temperatures in the range between 600° C. and 850° C. and preferably in the range between 700° C. and 800° C. Heating of the alumina hydrate may be carried out in air, in vacuum or under a blanket of nitrogen or some other inert atmosphere. Experience has shown that the time required to convert an alumina hydrate to an activated alumina is not particularly critical, although it is usually more than 1 hour with equilibrium being attained after about 4 hours. Particularly satisfactory results have been obtained using activated aluminas having an internal pore volume greater than 1 cc/g., which have been prepared by heating the α-monohydrate (boehmite) to a temperature in the range between 700° C. and 800° C. for a period between 4 and 24 hours.

Apart from the necessity of using only those activated aluminas having an internal pore volume greater than 0.8 cc/g., there does not appear to be any critical range of specific surface area required. In general, activated aluminas have a high internal porosity also possess a specific surface area higher than 100 $m^2/g$. and, in most instances, usually higher than 300 $m^2/g$. (the usual order of magnitude of specific surface area being between 300 and 400 $m^2/g$.). Activated aluminas which have a high specific surface area but a low internal porosity have been found to yield polymerization catalysts with markedly low productivities, which demonstrates the necessity of using only those activated aluminas having an internal pore volume greater than 0.8 cc/g. to prepare the supported cocatalyst used, in turn, to form the polymerization catalyst.

Although the productivity of the ultimate polymerization catalyst does not appear to be substantially affected by the granulometry of the particular activated alumina used to prepare the supported cocatalyst, experience has indicated that the mean particle diameter of the activated alumina should be in the range between 1 and 500μ and preferably in the range between 40 and 200μ with good morphology. Consequently, for a given internal pore volume, the activated aluminas used will have a higher specific surface area than will activated aluminas of larger particle size. For best results, the particle size distribution of the particular activated aluminas used to form the supported cocatalyst should be very narrow, particularly when a suspension or gas phase polymerization is to be conducted. Excellent results have been obtained when the supported cocatalysts are prepared using activated aluminas having a mean particle size diameter close to 100μ with a very narrow particle size distribution.

To prepare the supported cocatalysts, a halogen-containing compound of a transition metal selected from Groups IV-A, V-A and VI-A of the Periodic Table is reacted under substantially anhydrous conditions with an activated alumina having a high surface area (i.e., 100 $m^2/g$. or higher) and an internal pore volume greater than 0.8 cc/g. Among the transition metal compounds which may be used are the halides, oxyhalides and alkoxyhalides of titanium, zirconium, vanadium and chromium, the best results being attained with titanium compounds, particularly titanium tetrachloride. Preferably, the halogen-containing transition metal compound should be a chlorine- or bromine-containing compound, such as $TiCl_4$, $TiBr_4$, $VCl_4$, $VOCl_3$, $VOBr_3$, $CrO_2Cl_2$, $Ti(OC_2H_5)_3Cl$, $Ti(OC_2H_5)_2Cl_2$ and $Ti(OC_2H_5)Cl_3$. Among the transition metal alkoxyhalides, use is preferably made of those compounds in which there is at least one halogen→transition metal bond and at least one alkoxy→transition metal bond in which the alkoxy group is linear or branched and contains from 1 to 18 carbon atoms.

The reaction between the activated alumina and the halogen-containing transition metal compound should be carried out substantially in the absence of moisture, since the presence of moisture reduces the catalytic activity of the resultant supported cocatalyst. To avoid absorbing atmosphere moisture during this reaction, the activation of the alumina hydrate should be carried out in an anhydrous medium and the resultant freshly prepared activated alumina then promptly reacted with the transition metal compound. The reaction between the activated alumina and the transition metal compound to form the supported cocatalyst may be carried out by any convenient method. By way of illustration, the halogen-containing transition metal compound may be vaporized and then used in its gaseous state, either in undiluted form or diluted by an inert gas, or it may be used in its liquid state again either undiluted or in the form of a solution. Where a solution is used, then the solvent should be the same as that used as a solvent or diluent in the polymerization reaction. The most active supported cocatalysts are those prepared by bringing the activated alumina directly into contact with pure (i.e., undiluted) halogen-containing transition metal compound while it is maintained in its liquid state, which may be accomplished simply by forming a suspension of the activated alumina in an excess amount of the transition metal compound. Alternatively, the reaction may be accomplished simply by pouring the halogen-containing compound in its liquid state over the activated alumina.

The temperature at which the reaction is carried out is not particularly critical. In general, the reaction may be carried out at temperatures between 0° C. and 300° C. When working at atmospheric pressure, the reaction temperature is selected between ambient temperature (15° C.) and the normal boiling temperature of the particular halogen-containing transition metal compound, the preferred temperature range being between 20° C. and 140° C.

The activated alumina and the halogen-containing transition metal compound are allowed to react together for a sufficient time to bring about the chemical "fixing" of the halogen-containing compound on the activated alumina, which is generally achieved at the end of one hour. During the reaction, no attempt should be made for the purpose of removing or extracting the hydrogen halide and other gaseous by-products which are formed in the course of the reaction between the halogen-containing compound and the activated alumina. For example, no attempt should be made to flush the reaction mixture with an inert gas, the reason being that the resultant cocatalysts have been found to be more active when the by-products of the reaction remain dissolved in the liquid medium. By operating in the preferred manner, supported cocatalysts are obtained in which the halogen-containing transition metal compounds are chemically bound to (i.e., "fixed") and supported by the activated aluminas. Proof that a chemical reaction has occurred is evident by elemental analysis of the supported cocatalysts obtained.

After the reaction, the supported cocatalyst may be flushed or extracted with an excess of the same halogenated transition metal derivative which was used for the reaction. It is then generally washed with an inert hydrocarbon solvent, such as pentane, hexane, or cyclohexane, to remove any excess transition metal compound which is not chemically fixed to the support. Supported cocatalysts treated in this manner invariably contain the transition metal compound in concentrations not less than 10 g. of the particular Group IV-A, V-A and VI-A transition metal per kilogram of activated alumina, as measured by elemental analysis.

Moreover, elemental analysis of the supported cocatalysts shows that the atomic ratio of halogen/metal of Groups IV-A, V-A and VI-A is higher than that of the halogen-containing transition metal compound which was used for the reaction. When $TiCl_4$ is used as halogenated derivative, the atomic ratio Cl/Ti in the supported cocatalyst is higher than 4. From such observations we have concluded that at least part of the hydrogen halide formed during the course of the "fixation" reaction between the halogen-containing transition metal derivative and the activated alumina is also chemically fixed on the alumina.

II. Formation of the Polymerization Catalyst

The polymerization catalyst is the reaction product of the supported cocatalyst and an organometallic compound of a metal of Groups I-B, II-A, II-B, III-B and IV-B of the Periodic Table, such as the organic compounds of lithium, magnesium, zinc, aluminum, or tin. For most polymerization reactions, the best results are obtained with the catalysts made of alkyl-aluminums.

The catalysts may be prepared using completely alkylated organometallic compounds, the alkyl chains of which contain from 1 to 18 carbon atoms and are either linear or branched, such as, for example, n-butyllithium, diethylmagnesium, diethylzinc, trimethylaluminum, triethylaluminum, tetraethyltin, and tetrabutyltin. In most instances, we prefer to prepare the catalysts using trialkylaluminums, the alkyl radicals of which contain from 4 to 18 carbon atoms, such as triisobutylaluminum, trioctylaluminum, tridecylaluminum, and trihexadecylaluminum. It is also possible to prepare highly active catalysts using those alkyl metal hydrides in which the alkyl radical also contains from 1 to 18 carbon atoms, such as diisobutylaluminum hydride and trimethyltin hydride. Among the organometallic compounds also suitable for forming the polymerization catalyst are those alkylaluminum halides in which the alkyl radical also contains from 1 to 18 carbon atoms, such as ethylaluminum sesquichloride, diethylaluminum chloride, and diisobutylaluminum chloride. Other organoaluminum compounds suitable for preparing the polymerization catalyst are those compounds obtained by reacting either a trialkylaluminum or a dialkylaluminum hydride in which the alkyl radical contains from 1 to 16 carbon atoms with one or more diolefins containing from 4 to 18 carbon atoms, among which reaction products are the organoaluminum compounds known as isoprenylaluminums.

To form the polymerization catalyst, the organometallic compound and the supported cocatalyst are reacted either in the presence of the olefin to be polymerized so that the catalyst forms in situ in the polymerization medium or, alternatively, the catalyst may be formed separately and then introduced into the polymerization reaction medium. The mole ratios of the organometallic compound to the particular transition metal compound and the reaction concentrations of the resultant polymerization catalysts are more fully discussed in the subsequent section on the polymerization reaction.

III. The Polymerization Reaction

The process of the invention is applicable to the polymerization of any α-olefins containing from 2 to 18 and preferably from 2 to 6 carbon atoms, such as ethylene, propylene, butene-1, 4-methylpentene-1, and hexene-1. The process may also be used in the interpolymerization of such olefins with one another and also with diolefins containing from 4 to 18 carbon atoms, which diolefins, include (a) non-conjugated aliphatic diolefins, such as hexadiene-1,4; (b) non-conjugated monocyclic diolefins, such as 4-vinylcyclohexene, 1,3-divinylcyclohexane, cycloheptadiene-1,4, or cyclooctadiene-1,5; (c) alicyclic diolefins having an endocyclic bridge, such as dicyclopentadiene or norbornadiene; and (d) the conjugated aliphatic diolefins, such as butadiene or isoprene. The process of the invention is particularly applicable, however, to the production of homopolymers of ethylene and of interpolymers (or copolymers, the terms being interchangeably used) containing at least 90 mole percent and preferably 95 mole percent of ethylene. As used herein, the term "polymerization of ethylene" includes both homopolymerization as well as co- or interpolymerization of ethylene with other α-olefins or diolefins or both.

To homo- or interpolymerize ethylene in accordance with the invention, the monomer or monomers need only be brought into contact with the polymerization catalyst at a temperature and at a pressure sufficient to initiate the polymerization reaction. The polymerization reaction may be carried out by any convenient solution or suspension polymerization technique or by using gas-phase polymerization conditions. When solution or suspension techniques are used, then the particular solvent or diluent used should be the same as those employed for washing the supported cocatalyst. These solvents or diluents are preferably aliphatic or cycloaliphatic hydrocarbons, such as butane, pentane, hexane, heptane, cyclohexane, methylcyclohexane, or mixtures thereof. Alternatively, the polymerization reaction may be carried out in a liquid pool of one of the monomers.

The pressure at which the polymerization reaction is conducted is generally between atmospheric pressure and 100 kg/cm$^2$ preferably between atmospheric pressure and 50 kg/cm$^2$. The temperature used is generally between 20° C. and 120° C., and preferably between 60° C. and 100° C. The polymerization may be carried out continuously or discontinuously.

The organometallic compound and the supported cocatalyst may be added separately to and the catalyst formed in situ in the polymerization medium. Alternatively, the catalyst may be formed separately by reacting the organometallic compound and the supported cocatalyst at a temperature in the range between −40° C. and 80° C. for a period which may range up to 2 hours, before introducing the resultant catalyst into the polymerization reactor. The organometallic compound may also be brought into contact with the supported cocatalyst in several stages, or else it may be added only in part to the polymerization reactor and remaining portion added during the polymerization reaction. Several different organometallic compounds may be used to form the polymerization catalyst.

The total amount of organometallic compound used to form the polymerization catalyst is not critical; it is generally between 0.02 and 50 mmoles per dm$^3$ of solvent, diluent, or reactor volume, and more frequently between 0.2 and 5 mmole/dm$^3$. The amount of supported cocatalyst used is based, in turn, on the concentration of the particular transition metal of Groups IV-A, V-A and VI-A in the supported cocatalyst. The amount of supported cocatalyst used should be such that the concentration of the transition metal in the polymerization medium will be between 0.001 and 2.5 and, preferably, between 0.01 and 0.25 gram-atom of transition metal per dm$^3$ of solvent, diluent, or reactor volume. Although the ratio of the amounts of organometallic compound and supported cocatalysts used to form the polymerization catalyst is not particularly critical, for best results the ratio between the organometallic compound and the metal of Groups IV-A, V-A or VI-A, expressed in mole/gram-atom, is higher than 1 and preferably higher than 10.

The molecular weight of the polymers produced by the process of the invention can be adjusted by adding to the polymerization medium one or more agents regulating the molecular weight, such as hydrogen, zinc, or diethylcadmium, or else carbonic anhydride. The specific gravity of the homopolymers produced by the process of the invention may also be controlled by adding to the polymerization medium an alkoxide of a metal of Groups IV-A and V-A of the Periodic Table. Thus, it is possible to produce polyethylenes of specific gravities intermediate between those of the polyethylenes produced by a high pressure process and those of conventional high density polyethylenes. Among the alkoxides which may be used for this purpose, those of titanium and vanadium in which the radicals each contain from 1 to 18 carbon atoms have been found to be particularly useful. Mention may be made, for example, of Ti(OCH$_3$)$_4$, Ti(OC$_2$H$_5$)$_4$, Ti[OCH$_2$CH(CH$_3$)$_2$]$_4$, Ti(OC$_8$H$_{17}$)$_4$, Ti(OC$_{16}$H$_{33}$)$_4$, and VO(OC$_2$H$_5$)$_3$.

By using the process of the invention it is possible to produce polyethylenes with catalyst productivities as high as 700 grams of polymer per gram of catalyst. Because of such high productivity, the residue of the transition metal remaining in the polymer is very low, generally lower than 20 mg/g in most instances, at which levels such residues are innocuous and unnoticed in the polymer. Consequently, the polymers made in accordance with the invention no longer require purification. No disagreeable coloration of the stabilized polymer and no corrosion in the equipment in which the polymer is used are observed.

Polyolefins produced by the process of the invention are generally characterized by a particularly high mean molecular weight, even if the polymerization is carried out at relatively high temperatures. In the case of polyethylene, the polymers are characterized by a melt index which is generally lower than 0.5. Furthermore, these polyethylenes are particularly suitable for extrusion and blow extrusion at remarkably high extrusion speeds without the problem of melt fracture occurring. Products manufactured with these polyethylenes have remarkably high resistance to crazing under tension.

EXAMPLES

The following examples are illustrative of the ease with which ethylene may be polymerized using halogen-containing transition metal compounds chemically bound to and supported by an activated alumina as cocatalysts in accordance with the invention. In each of these examples, either the melt index (MI) of the polymer was measured by ASTM Test Method D-1238-57T or the high load melt index (HLMI) was determined by the same test method, but with 440 p.s.i.g. load on the ram of the melt indexer instead of 44 p.s.i.g. (1-P) pressure as required by the standard test method.

EXAMPLE 1

An α-alumina monohydrate (boehmite) sold under the trade mark "KETJEN Grade B" was heated to a temperature of 700° C. and maintained at that temperature for 5 hours under an atmosphere of nitrogen, yielding an activated alumina having an internal pore volume of 1.13 cc/g. and an active surface area of 360 m$^2$/g. Five grams of this activated alumina was then suspended in 25 cc of TiCl$_4$ and the suspension brought to a temperature of 130° C., with vigorous agitation, for 1 hour. The solid reaction product was separated and washed with hexane until all traces of TiCl$_4$ disappeared from the wash solvent, and the resultant supported cocatalyst was then dried in a current of dry nitrogen. Elemental analysis of the resultant supported cocatalyst showed that it contained 17 g/kg of titanium and 78 g/kg of chlorine, from which the Cl/Ti atom ratio was calculated to be 6.2.

Seventy-five milligrams of the supported cocatalyst was suspended in 500 cc of hexane in a 1500 cc stainless steel reactor provided with a blade-type agitator, to which reactor 100 mg of triisobutylaluminum was then added. The temperature was brought to 85° C. and ethylene introduced under a partial pressure of 10 kg/cm$^2$ and hydrogen under a partial pressure of 4 kg/cm$^2$. Polymerization was continued for 1 hour while maintaining the partial pressure of ethylene constant by continuous introduction of ethylene. After degasification of the autoclave, 51 g. of polyethylene was collected, which corresponded to an hourly productivity of the catalyst of 680 g. PE/g. of catalyst. The specific hourly activity of the catalyst (adjusted to reflect the weight of titanium used and to a pressure of ethylene of 1 kg/cm$^2$) was 3990 g. PE/g Ti.h.kg/cm$^2$ C$_2$H$_4$. The polyethylene obtained had a high load melt index (measured according to the standard ASTM D 1238-57T) of 0.65 and a specific gravity of 0.963.

EXAMPLE 2

An alumina monohydrate sold under the trade mark "BASF 10 176/780" was kept at 740° C. for 16 hours, yielding an activated alumina having a pore volume of 0.85 cc/g and the specific surface area of 236 cm$^2$/g. Supported cocatalyst was prepared with this activated alumina and TiCl$_4$ using the technique described in Example 1, the titanium concentration of the resultant cocatalyst being 16 g/kg. and the chlorine concentration being 64 g/kg. The Cl/Ti atom ratio was therefore 5.4.

Polymerization of ethylene was then carried out as in Example 1, except that 100 mg. of supported cocatalyst was used, at the completion of which 54 g. of polyethylene was collected. The hourly productivity was 540 g. PE/g. of catalytic element and the specific activity was 3370 g PE/g Ti.h.kg/cm$^2$ C$_2$H$_4$. The polyethylene obtained had a high load melt index of 0.04 and a specific gravity is 0.963.

EXAMPLE 3

Activated alumina was prepared by the same procedure as in Example 1, except that an alumina hydrate sold under the name "HARSHAW A1/1401 P" was kept at 700° C. for 16 hours and yielded an activated alumina having a pore volume of 0.65 cc/g and a specific surface area of 190 m$^2$/g.

This activated alumina was then reacted with TiCl$_4$ in accordance with Example 1 to form a supported cocatalyst in which the titanium concentration was found to be 14 g/kg and the chlorine concentration 57 g/kg. The Cl/Ti atom ratio therefore was 5.5.

Polymerization of ethylene was carried out as in Example 1 except that 100 mg of cocatalyst was used, at the end of which polymerization 19 g. of polyethylene was obtained. The hourly productivity was 190 g. PE/g of catalytic element and the specific activity was 1360 g. PE/g Ti.h.kg/cm$^2$ C$_2$H$_4$. The polyethylene obtained had a high load melt index of 1 and specific gravity is 0.963.

EXAMPLE 4

The procedure for making the activated alumina was the same as in Example 1, except that an alumina sold under the trade mark "ALCOA F 20" was kept at 740° C. for 16 hours, yielding an activated alumina having a pore volume of 0.35 cc/g and a specific area surface of 168 m$^2$/g. With this activated alumina there was prepared with TiCl$_4$ (as in Example 1) a catalyst in which the titanium concentration was 11 g/kg and the chlorine concentration 46 g/kg. The Cl/Ti atom ratio therefore was 5.6

Polymerization of ethylene was carried out as in Example 1 except that 100 mg of cocatalyst was used, at the end of which polymerization 10 g of polyethylene was obtained. The hourly productivity was 100 g. PE/g of catalytic element and the specific activity was 910 g. PE/g Ti.h.kg/cm$^2$ C$_2$H$_4$. The polyethylene obtained has a high load melt index of 0.16 and a specific gravity is 0.963.

Examples 1 and 2 show that the process of the invention makes it possible to produce polyethylenes of very high molecular weight at a relatively high temperature and with excellent catalyst productivity.

Examples 3 and 4 show that when the pore volume of the activated alumina is less than 0.8 cc/kg, then the catalyst productivity and specific activity will be much lower than that obtained in Examples 1 and 2.

EXAMPLE 5

An activated alumina having a pore volume of 0.2 cc/g and a specific surface area of 423 cm$^2$/g was prepared by heating an alumina sold under the trade mark "KETJEN LOW" for 700° C. for 5 hours. From this activated alumina there was prepared as in Example 1 a catalytic element having a titanium concentration of 0.3 g/kg and a chlorine concentration also 0.3 g/kg.

A polymerization test was carried out as in Example 1, but even with 100 mg of cocatalyst it was possible to prepare only traces of polymer.

This test showed that activated alumina having very high specific surfaces give extremely mediocre results when the pore volume is low.

EXAMPLE 6

The procedure was the same as in Example 1, except that the activated alumina was reacted with TiCl$_4$ at 90° C., yielding a supported cocatalyst in which the titanium concentration was 24 g/kg and the chlorine concentration 76 g/kg. The Cl/Ti atom ratio therefore was 4.3

Upon formation of the catalyst, ethylene was polymerized as in Example 1, except that 100 mg of supported cocatalyst was used, from which reaction 57 g. of polyethylene was obtained. The hourly productivity was 570 g. PE/g of catalyst and the specific activity was 2360 g. PE/g Ti.h.kg/cm$^2$ C$_2$H$_4$. The polyethylene obtained had a high load melt index of 0.33 and a specific gravity of 0.963.

EXAMPLE 7

The procedure is as in Example 1, except that the activated alumina was reacted with $TiCl_4$ at 25° C. to form a supported cocatalyst in which the titanium concentration was 22 g/kg and the chlorine concentration 69 g/kg. The Cl/Ti atom ratio therefore was 4.2.

After forming the catalyst, ethylene was polymerized as in Example 1, except that 100 mg of supported cocatalyst was used. At the end of the reaction 59 g. of polyethylene was obtained. The hourly productivity was 590 g. PE/g of catalyst and the specific activity was 2680 g. PE/g Ti.h.kg/cm$^2$C$_2$H$_4$. The polyethylene obtained had a high load melt index of 0.30 and a specific gravity of 0.963.

EXAMPLE 8

The supported cocatalyst was prepared as in Example 1, except that the alumina was activated at 750° C. and the activated alumina was reacted with $TiCl_4$ at 225° C. under autogenous pressure. Elemental analysis of the supported cocatalyst showed that it contained 18 g/kg of titanium and 75 g/kg of chlorine, from which the Cl/Ti atom ratio was calculated to be 6.2.

Polymerization of ethylene was carried out as in Example 1, except that 100 mg of supported cocatalyst was used. The yield was 64 g. of polyethylene. The hourly productivity was 640 g. PE/g of catalyst and the specific activity was 3560 g. PE/g Ti.h.kg/cm$^2$ C$_2$H$_4$. The polyethylene obtained had a high load melt index of 1.07 and a specific gravity of 0.963.

Examples 1, 6, 7 and 8 show that the temperature at which the activated alumina is reacted with $TiCl_4$ has no determining influence on the essential properties of the supported cocatalyst.

EXAMPLE 9

The same procedure was used as in Example 1, except that the polymerization was carried out in the presence of 100 mg of supported cocatalyst and 57 mg. of triethylaluminum rather than 100 mg. of triisobutylaluminum. In addition, the partial pressure of hydrogen was 10 kg/cm$^2$. Under these conditions 27 g. of polyethylene was obtained. The hourly productivity was 270 g. PE/g of catalytic element and the specific activity was 1590 g. PE/g Ti.h.kg/cm$^2$ C$_2$H$_4$.

The polyethylene obtained had a melt index of 0.17 and a specific gravity of 0.963.

EXAMPLE 10

The procedure was the same as in Example 1, except that the polymerization was carried out in the presence of 100 mg. of supported cocatalyst reacted with 350 mg. of trihexadecylaluminum. In addition, the partial pressure of hydrogen is 10 kg/cm$^2$. Under such condition, 58 g. of polyethylene was obtained. The hourly productivity was 580 g. of PE/kg of catalyst and the specific activity was 3410 g. of PE/g Ti.h.kg/cm$^2$ C$_2$H$_4$. The polyethylene obtained had a melt index of 0.04 and a specific gravity of 0.963.

EXAMPLE 11

The same procedure was used as in Example 1, except that the polymerization was effected in the presence of 100 mg. of supported cocatalyst and 140 mg. of diethylaluminum chloride. In addition, the partial pressure of hydrogen is 10 kg/cm$^2$. At the completion of the polymerization 30 g. of polyethylene was collected. The hourly productivity was 300 g. PE/g of catalyst and the specific activity was 1760 g. PE/g Ti.h.kg/cm$^2$ C$_2$H$_4$. The polyethylene obtained had a high load melt index of 0.25 and a specific gravity of 0.963.

EXAMPLE 12

The procedure was the same as in Example 1, except that the polymerization was conducted in the presence of 100 mg. of supported cocatalyst and 75 mg. of isoprenylaluminum. The isoprenylaluminum used to prepare the catalyst was itself the product of the reaction of triisobutylaluminum with isoprene. It is characterized by the fact that the ratio of hydrolysis products containing 5 carbon atoms to those comprising 4 carbons is 1.4.

During the polymerization, the partial pressure of hydrogen was 10 kg/cm$^2$. The yield was 37 g of polyethylene. The hourly productivity was 370 g. PE/g of catalyst and the specific activity was 2180 g. PE/g Ti.h.kg/cm$^2$ C$_2$H$_4$. The polyethylene obtained had a melt index of 0.07. Its specific gravity is 0.963.

Examples 1, 9, 10 11 and 12 show that the process of the invention may be used to produce polyethylenes having particularly high molecular weights, whatever the nature of the organometallic compound and despite a high concentration of molecular weifht regulating agent. These examples also show that those organometallic compounds having long chain alkyl radicals yield more interesting results than those in which the alkyl radicals are of the short chain type.

EXAMPLE 13

The supported cocatalyst was prepared and the polymerization test was carried out as in Example 1, except that 100 mg. of supported cocatalyst was used and 16.5 mg. of $Ti(OC_8H_{17})_4$ was added to the polymerization medium to control molecular weight. The yield was 40 g of polyethylene. The hourly productivity was 400 g. PE/g of catalytic element and the specific activity was 2380 g. PE/g Ti.h.kg/cm$^2$ C$_2$H$_4$. The polyethylene obtained had a melt index of 0.05 and a specific gravity of 0.951 which is in contract to the specific gravity of 0.963 in Example 1 which was carried out in the absence of $Ti(OC_8H_{17})_4$.

EXAMPLE 14

An alumina monohydrate of the alpha type (boehmite) sold under the trade mark "KETJEN Grade B" was kept at 750° C. for 5 hours in an atmosphere of nitrogen, yielding an activated alumina having a pore volume of 1.1 cc/g and an active surface area of 235 m$^2$g. Five grams of this activated alumina was suspended in 50 cc of a saturated solution of $Ti(OC_2H_5) Cl_3$ in hexane, and the suspension was kept at 60° C. for one hour. The solid reaction product was separated and washed with hexane until all trace of titanium derivative disappears from the wash hexane, after which it was then dried in a current of dry nitrogen. Elemental analysis of the catalytic element formed in this manner shows that it contained 31 g/kg of titanium and 76 g/kg of chlorine. The Cl/Ti atom ratio therefore was 3.3.

One hundred milligrams of this supported cocatalyst was suspended in 500 cc of hexane in a 1500 cc stainless steel reactor provided with a blade type agitator, to which 100 mg. of triisobutylaluminum was then added. The temperature was brought to 85° C. and ethylene was introduced with a partial pressure of 10 kg/cm$^2$ and hydrogen with a partial pressure of 4 kg/cm$^2$. Polymerization was continued for 1 hour, keeping the partial pressure of ethylene constant by continuously introducing ethylene.

After degasification of the autoclave, 11 g. of polyethylene was obtained. This corresponds to an hourly catalyst productivity of 110 g. PE/g of catalyst. The hourly specific activity of the catalyst (referred to the weight of titanium used and to an ethylene pressure of 1 kg/cm$^2$) was 355 g. PE/g Ti.h.kg/cm$^2$ C$_2$H$_4$. The polyethylene obtained had a high load melt index of 0.47 and a specific gravity of 0.963.

EXAMPLE 15

The supported cocatalyst was prepared as in Example 14 except that the activated alumina was suspended in a solution of TiCl$_4$ in hexane (43 g/l. solution) and the temperature was kept at 70° C. Elemental analysis of the supported cocatalyst showed that it contained 25 g/kg of titanium and 75 g/kg of chlorine. The Cl/Ti atom ratio was therefore 4.1.

The polymerization reaction carried out as in Example 1 except that 200 mg. of supported cocatalyst was used, the partial pressure of ethylene was 8 kg/cm$^2$, and that of hydrogen was 15 kg/cm$^2$. At the end of the reaction 33 g. of polyethylene was obtained. The hourly productivity was 165 g. PE/g of catalyst and the specific activity was 820 g. PE/h.g. Ti.kg/cm$^2$ C$_2$H$_4$. The polyethylene obtained was characterized by a melt index of 0.47 g/10 min.

EXAMPLE 16

Supported cocatalyst was prepared as in Example 14, except that the activated alumina was suspended in a solution of VOCl$_3$ in hexane (46 g/l. solution) and the temperature was kept at 70° C. Elemental analysis of the resultant supported cocatalyst shows that it contained 34 g/kg of vanadium and 72 g/kg of chlorine. The Cl/V atom ratio therefore was 8.05.

The polymerization test was carried out as in Example 15 yielding 24 g of polyethylene. The hourly productivity was 120 g. PE/g of catalyst and the specific activity was 440 g. PE/h.g. V.kg/cm$^2$ C$_2$H$_4$. The polyethylene obtained was characterized by a melt index of 2.58 g/10 min.

EXAMPLE 17

The supported cocatalyst was prepared as in Example 14 except that the activated alumina was suspended in a solution of CrO$_2$Cl$_2$ in CCl$_4$ (25 ml/l. solution) and the temperature was kept at 70° C. Elemental analysis of the resultant supported cocatalyst shows that it contained 15 g/kg of chromium and 77 g/kg of chlorine. The Cl/Cr atom ratio was therefore 7.5.

The polymerization test was carried out as in Example 15, yielding 8 g. of polyethylene. The hourly productivity was 40 g. PE/g of catalytic element and the specific activity was 330 g. PE/h.g Cr.kg/cm$^2$ C$_2$H$_4$. The polyethylene obtained was characterized by a melt index of 1.08 g/10 min.

We claim:

1. A process for the polymerization of ethylene which comprises contacting ethylene, at a temperature and at a pressure sufficient to initiate the polymerization reaction, with a catalytic amount of
   (a) a tri(C$_4$-C$_{18}$alkyl) aluminum compound; and
   (b) a supported cocatalyst prepared by reacting, under substantially anhydrous conditions,
      (1) titanium tetrachloride together with
      (2) an activated alumina having a high surface area and an internal pore volume greater than 0.8 cc/g., to form a supported cocatalyst in which (a) the TiCl$_4$ is chemically bound to and supported by the activated alumina, (b) the concentration of the titanium compound is greater than 10 grams of titanium metal per kilogram of activated alumina, and (c) the ratio of chlorine to titanium metal in the supported cocatalyst is higher than that of the TiCl$_4$.

2. A process for the polymerization of ethylene according to claim 1 in which the supported cocatalyst is prepared by
   (1) heating an alumina hydrate to a temperature in the range from about 500° C. to 900° C. for a period of time sufficient to form an activated alumina having a high surface area and an internal pore volume greater than 0.8 cc/g., and
   (2) reacting the resultant activated alumina with TiCl$_4$, to form a supported cocatalyst in which (a) the TiCl$_4$ metal compound is chemically bound to and supported by the activated alumina, and (b) the concentration of the titanium metal compound is greater than 10 grams of the titanium metal per kilogram of activated alumina.

3. A process for the polymerization of ethylene according to claim 1, in which the supported cocatalyst is prepared by
   (1) heating the α-monohydrate of alumina to a temperature in the range from about 700° C. to 800° C. for a period of time sufficient to form an activated alumina having a high surface area and an internal pore volume greater than 1 cc/g., and
   (2) reacting the resultant activated alumina with TiCl$_4$, to form a supported cocatalyst in which (a) the titanium metal compound is chemically bound to and supported by the activated alumina, and (b) the concentration of the titanium metal compound is greater than 10 grams of the titanium metal per kilogram of activated alumina.

4. A process for the polymerization of ethylene according to claim 1, in which the supported cocatalyst is prepared by suspending the activated alumina in an excess amount of the titanium metal compound maintained as a liquid during such reaction while permitting the gaseous byproducts of the reaction between the activated alumina and the titanium metal compound to remain in the reaction mixture during each reaction.

5. A process for preparing catalysts for the low-pressure polymerization of ethylene which comprises preparing a supported cocatalyst by
   (1) heating an alumina hydrate to a temperature in the range from about 500° C. to 900° C. for a period of time sufficient to form an activated alumina having a high surface area and an internal pore volume greater than 0.8 cc/g., and
   (2) reacting the activated alumina under substantially anhydrous conditions with a titanium tetrachloride, to form a supported cocatalyst in which (a) the titanium tetrachloride compound is chemically bound to and supported by the activated alumina, (b) the concentration of the titanium metal compound is greater than 10 grams of the titanium metal per kilogram of activated alumina, and (c) the ratio of chlorine to titanium metal in the supported cocatalyst is higher than that of the titanium tetrachloride compound, and (3) reacting the resultant supported cocatalyst with a tri($C_4$-$C_{18}$alkyl)aluminum.

6. A process for preparing polymerization catalysts according to claim 5, in which the activated alumina is prepared by heating an α-monohydrate of alumina to a temperature in the range from about 700° C. to 800° C. for a period of time sufficient to form an activated alumina having a high surface area and an internal pore volume greater than 1 cc/g.

7. A process for preparing catalysts according to claim 5, in which the supported cocatalyst is formed by suspending the activated alumina in an excess amount of the titanium metal compound maintained as a liquid during such reaction while permitting the gaseous by-products of the reaction between the activated alumina and the titanium metal compound to remain in the reaction mixture during such reaction.

* * * * *